(12) United States Patent
Choi et al.

(10) Patent No.: US 8,083,292 B2
(45) Date of Patent: Dec. 27, 2011

(54) SEATBACK FRAME FOR VEHICLES

(75) Inventors: Byung Yong Choi, Hwaseong-si (KR); Sang Do Park, Ansan-si (KR); Dong Woo Jeong, Hwaseong-si (KR); Sang Nam Park, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 12/325,900

(22) Filed: Dec. 1, 2008

(65) Prior Publication Data

US 2009/0152928 A1 Jun. 18, 2009

(30) Foreign Application Priority Data

Dec. 14, 2007 (KR) .................. 10-2007-0131012

(51) Int. Cl.
*B60N 2/68* (2006.01)

(52) U.S. Cl. ................................. 297/452.18

(58) Field of Classification Search ............ 297/452.18, 297/452.38, 463.1
See application file for complete search history.

(56) References Cited

U.S. PATENT DOCUMENTS

| 6,783,177 | B1 * | 8/2004 | Nakano | 297/216.12 |
|---|---|---|---|---|
| 6,857,698 | B2 * | 2/2005 | Saberan et al. | 297/216.13 |
| 7,044,544 | B2 * | 5/2006 | Humer et al. | 297/216.12 |
| 7,066,552 | B2 * | 6/2006 | Yoshida | 297/452.18 |
| 2004/0113481 | A1 * | 6/2004 | Saberan et al. | 297/452.18 |
| 2006/0273649 | A1 | 12/2006 | Saberan | |
| 2007/0152489 | A1 * | 7/2007 | Ishizuka | 297/411.32 |
| 2008/0265639 | A1 * | 10/2008 | Siegrist et al. | 297/217.3 |
| 2009/0045658 | A1 * | 2/2009 | Humer et al. | 297/216.12 |

FOREIGN PATENT DOCUMENTS

JP 2000-118279 A 4/2000

* cited by examiner

*Primary Examiner* — Peter R. Brown
(74) *Attorney, Agent, or Firm* — Morgan, Lewis & Bockius LLP

(57) ABSTRACT

A seatback frame for vehicles has a lower cross member that prevents a back pad and a recliner hinge shaft from interfering with each other. The seatback frame includes a back frame and a lower cross member. The lower cross member includes a reinforcing part and a hinge-shaft cover. The back frame is hinged to a seat frame via a recliner hinge shaft. The lower cross member couples both sides of the lower end of the back frame to each other. The reinforcing part has the shape of an embossment which extends in a longitudinal direction of the lower cross member. The hinge-shaft cover is provided on the lower portion of the lower cross member, and is bent to surround the recliner hinge shaft.

3 Claims, 3 Drawing Sheets

SEATBACK FRAME FOR VEHICLES

CROSS-REFERENCE TO RELATED APPLICATION

The present application claims priority to Korean Application No. 10-2007-0131012 filed Dec. 14, 2007, the entire contents of which application is incorporated herein for all purposes by this reference.

BACKGROUND OF THE INVENTION

1. Field of the Invention

The present invention relates to a seatback frame for vehicles, which is constructed such that a lower cross member couples both sides of a lower end of a back frame, to which a recliner hinge shaft is hinged, to each other.

2. Description of Related Art

Typically, a vehicle seat includes a seat frame and a back frame. The seat frame supports the lower part of a passenger's body when the passenger is seated. The back frame is coupled to the seat frame in such a way as to tilt forward and backward, and support the upper part of the passenger's body.

As shown in FIGS. 1 and 2, a conventional back frame 20 generally is pivotally coupled to a seat frame via a recliner hinge shaft 30, as seen in detail 1A of FIG. 1. Referring to detail 1B of FIG. 1, a lower cross member 10 is provided on the lower portion of the back frame 20, and connects both sides of the back frame 20 to each other to support the back frame 20.

A back pad 40 is provided on the back frame 20 to allow a passenger to comfortably sit in the seat. In order to prevent the back pad 40 and the recliner hinge shaft 30 from interfering with each other when the back frame 20 tilts, the outer portion of the recliner hinge shaft 30 is surrounded with a tube 50.

However, because the conventional lower cross member 10 usually has an "l"-shaped cross section, the lateral strength of the lower cross member 10 is low. Thus, it is difficult for the lower cross member 10 to satisfy regulations regarding the strain requirements thereof.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention have been developed to overcome the above problems. Various aspects of the present invention provide for a seatback frame for vehicles having a lower cross member, which increases the lateral strength of a back frame, and prevents a back pad and a recliner hinge shaft from interfering with each other.

One aspect of the present invention is directed to a seatback frame for vehicles including a back frame hingedly coupled to a seat frame by a recliner hinge shaft, and/or a lower cross member coupling opposing sides of a lower end of the back frame to each other. The lower cross member may include a reinforcing part having an embossed rib extending in a longitudinal direction of the lower cross member, and/or a hinge-shaft cover provided on a lower portion of the lower cross member, the hinge-shaft cover being curved to surround the recliner hinge shaft.

A lateral section of the lower cross member may have a hook shape which surrounds the recliner hinge shaft.

A welding flange may be provided on each of opposing ends of the lower cross member, and may be welded to a respective side of the lower end of the back frame.

A locking projection may be provided on the hinge-shaft cover in such a way as to extend upwards relative to the back frame, and may prevents a back pad from interfering with the recliner hinge shaft when the recliner hinge shaft is operated.

Another aspect of the present invention is directed to a vehicle seat including the above-described seatback frames.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
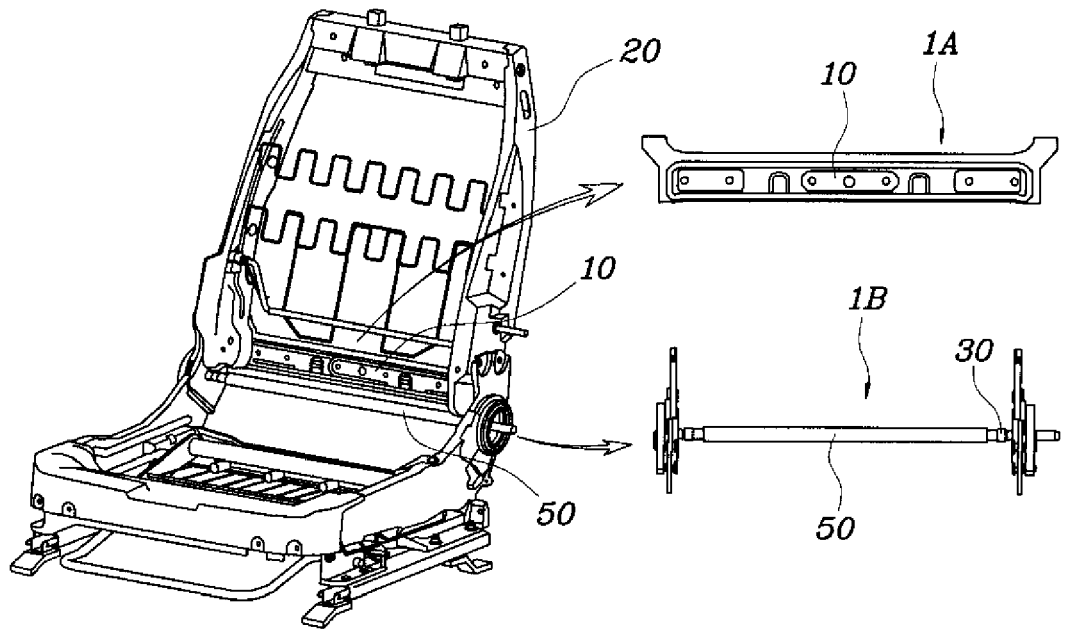
FIG. 1 is a perspective view showing a conventional back frame for vehicles, in which detail 1A is an enlarged view showing a lower cross member, and detail 1B is an enlarged view showing a recliner hinge shaft.
Figure 2:
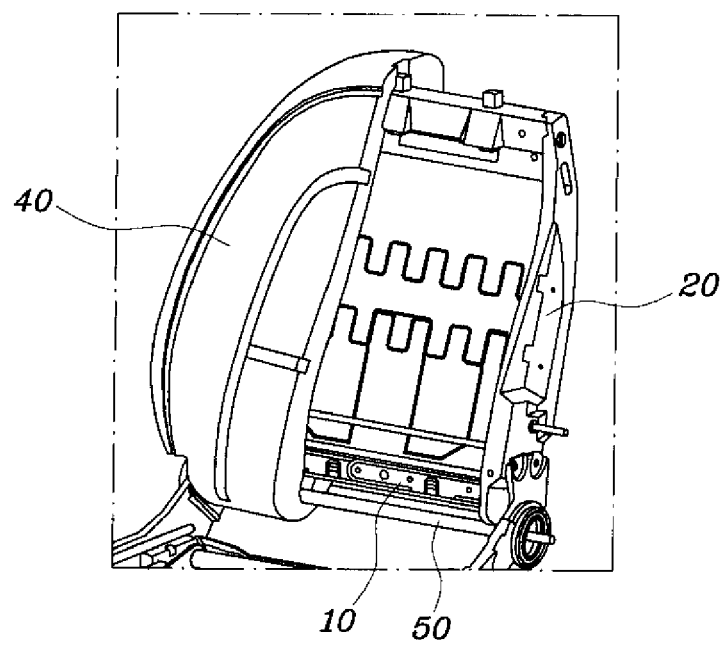
FIG. 2 is a partial cutaway view showing the conventional back frame for vehicles.
Figure 3:
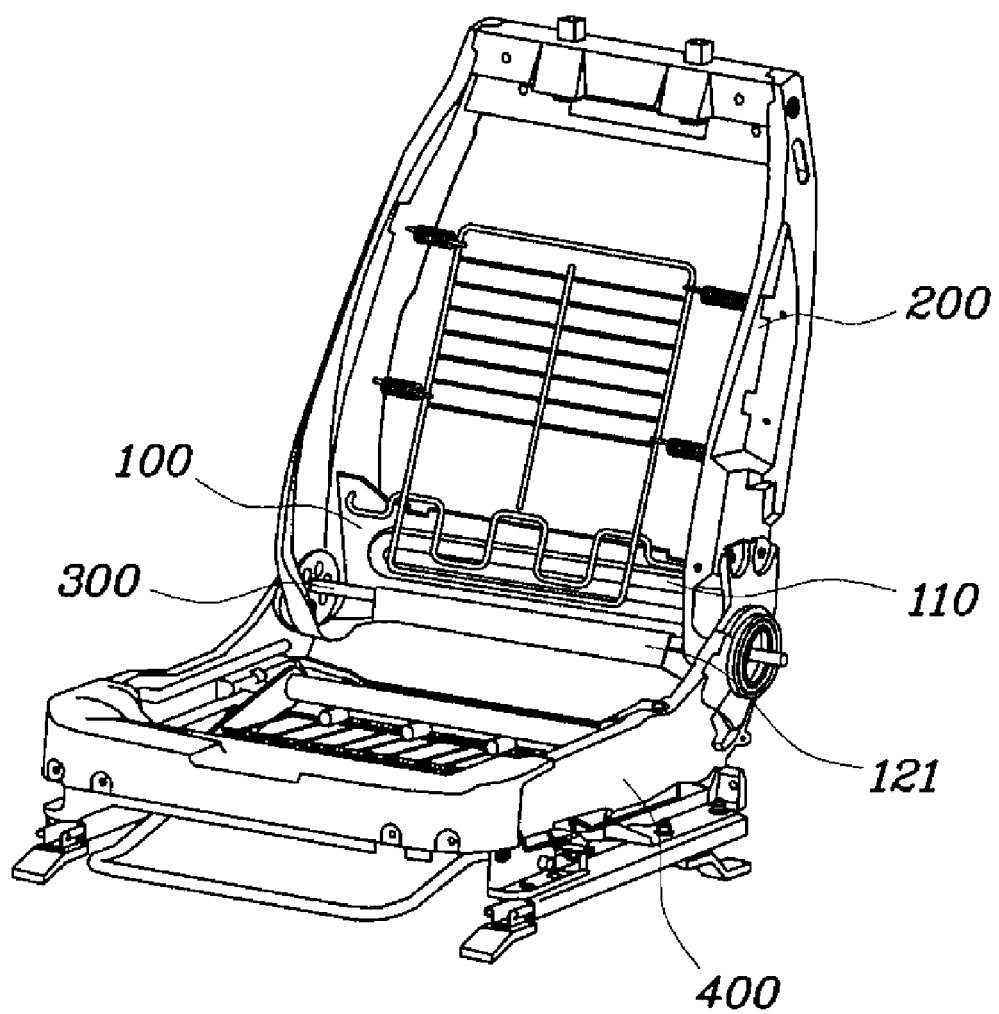
FIG. 3 is a perspective view showing an exemplary seatback frame for vehicles according to the present invention.
Figure 4A:
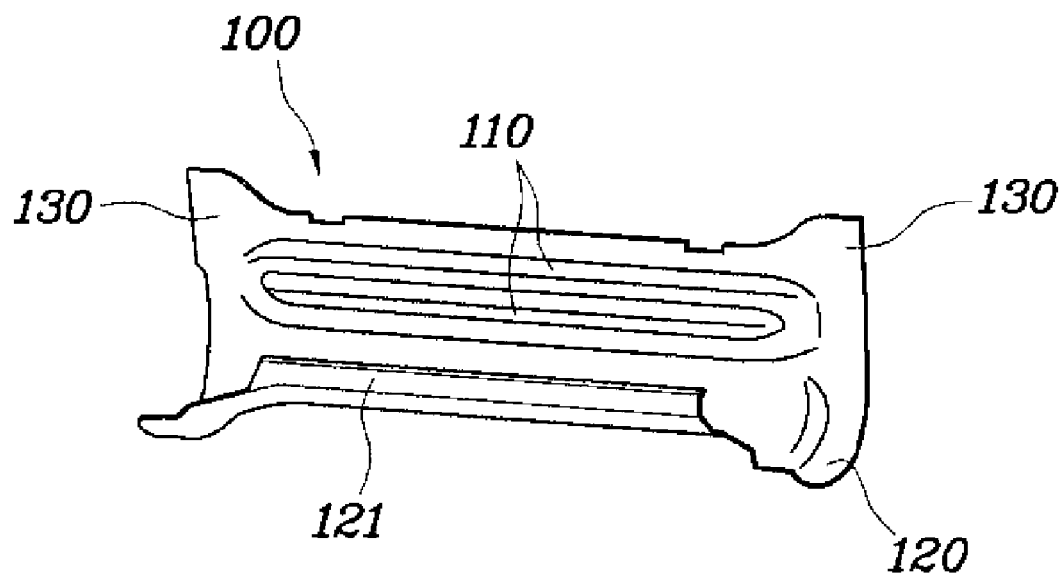
FIGS. 4A and 4B are a perspective view and a side view, respectively, showing an exemplary lower cross member of the seatback frame for vehicles according to the present invention.
Figure 4B:
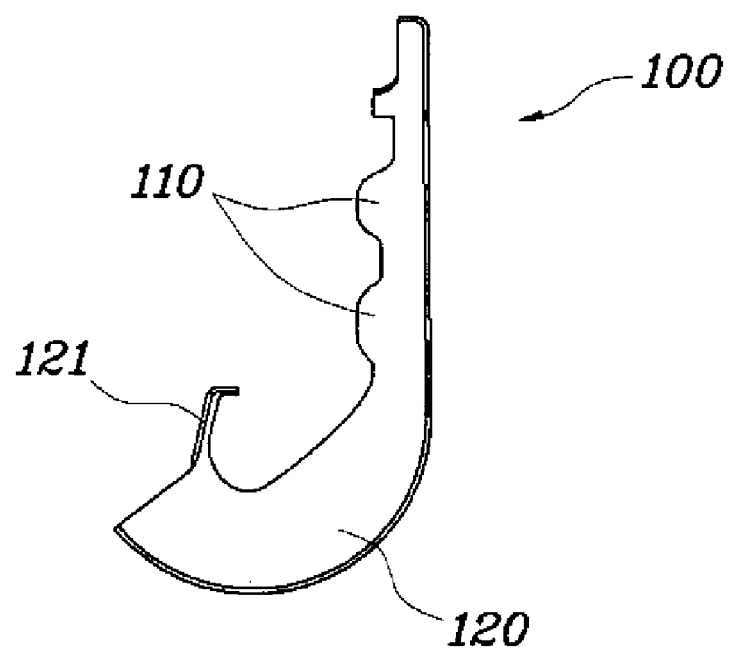

As shown in FIGS. 3, 4A, and 4B, the seatback frame is constructed so that a lower cross member 100 is mounted to the lower end of a back frame 200 in such a way as to surround a recliner hinge shaft 300.

In detail, the back frame 200 is rotatably coupled to a seat frame 400 via a recliner hinge shaft 300. The back frame 200 is provided with a back pad so as to allow a passenger to comfortably sit in a seat. Since the general construction of the back frame 200 and the recliner hinge shaft 300 is similar to the construction of a back frame and a recliner hinge shaft used in a conventional vehicle seat, a detailed description of the back frame 200 and the recliner hinge shaft 300 will be omitted herein.

The lower cross member 100 is provided on the lower portion of the back frame 200 having the recliner hinge shaft 300, surrounds part of the recliner hinge shaft 300, and couples both sides of the lower portion of the back frame 200 to each other.

Welding flanges 130 are provided on both ends of the lower cross member 100, and are welded to the corresponding sides of the lower end of the back frame 200. Each welding flange 130 has a step and is welded to an associated inner surface of the back frame 200. Thus, even if welding is poor, the step can withstand lateral impacts.

A reinforcing part 110 is provided on the lower cross member 100 in the longitudinal direction thereof. The reinforcing part 110 has the shape of an embossment which protrudes forwards relative to the back frame 200, so that the lateral strength of the back frame 200 is increased when lateral impacts act on the lower cross member 100.

A hinge-shaft cover 120 is provided on the lower portion of the lower cross member 100 in such a way as to be bent in the shape of a hook. A locking projection 121 is provided on the hinge-shaft cover 120 in such a way as to extend upwards relative to the back frame 200, and prevents the back pad from interfering with the recliner hinge shaft 300 when the recliner hinge shaft 300 is operated.

In various embodiments of the present invention, the recliner hinge shaft 300 is positioned in a space defined by the bent hinge-shaft cover 120. The hinge-shaft cover 120 prevents the back pad and the recliner hinge shaft 300 from interfering with each other when the back frame 200 tilts.

Therefore, according to the present invention, a conventional tube that surrounds the recliner hinge shaft 300 so as to prevent the back pad and the recliner hinge shaft 300 from interfering with each other when the back frame 200 tilts, is not required. Thus, various embodiments of the present invention reduce the number of parts, the cost of the product, and the number of man-hours.

As described above, the present invention provides a seatback frame for vehicles, in which a lower cross member having an increased section modulus is provided on the lower end of a back frame in such a way as to surround a recliner hinge shaft, thus increasing the lateral strength of the back frame.

Further, the present invention provides a seatback frame for vehicles, which prevents a back pad and a recliner hinge shaft from interfering with each other via a lower cross member without using an additional tube, thus reducing the number of parts, the cost of the product, and the number of man-hours.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A seatback frame for vehicles, comprising:
 a back frame hingedly coupled to a seat frame by a recliner hinge shaft; and
 a lower cross member coupling opposing sides of a lower end of the back frame to each other, the lower cross member including:
 an upper reinforcing part having an embossed rib extending in a longitudinal direction of the lower cross member between the opposing sides, wherein the embossed rib is disposed above the recliner hinge shaft and below an upper edge of the lower cross member, and protrudes towards a back pad; and
 a hinge-shaft cover provided on a lower portion of the lower cross member below the upper reinforcing part, the hinge-shaft cover being curved to surround the recliner hinge shaft and extending continuously in a longitudinal direction thereof;
 wherein a welding flange is provided on each opposing end of the lower cross member, and is welded to a respective side of the lower end of the back frame;
 wherein a cross-section of the lower cross member has a hook shape which substantially surrounds the recliner hinge shaft; and
 wherein a locking projection extends along an edge of the hinge-shaft cover in such a way as to extend upwards relative to the back frame and a radial distance of the locking projection from the recliner hinge shaft is smaller than a diameter of a welding flange from the recliner hinge shaft so as to prevent the back pad from interfering with the recliner hinge shaft when the recliner hinge shaft is operated; and
 wherein the locking projection has opposing side edges spaced inwardly from the welding flanges of the lower cross member.

2. A vehicle seat comprising the seatback frame of claim 1.

3. A seatback frame for vehicles, comprising:
 a back frame hingedly coupled to a seat frame by a recliner hinge shaft; and
 a lower cross member coupling opposing sides of a lower end of the back frame to each other, the lower cross member including:
 an upper reinforcing part having an embossed rib extending in a longitudinal direction of the lower cross member between the opposing sides, wherein the embossed rib is disposed above the recliner hinge shaft and below an upper edge of the lower cross member, and protrudes towards a back pad; and
 a hinge-shaft cover provided on a lower portion of the lower cross member below the upper reinforcing part, the hinge-shaft cover being curved to surround the recliner hinge shaft and extending continuously in a longitudinal direction thereof;
 wherein a welding flange is provided on each opposing end of the lower cross member, and is welded to a respective side of the lower end of the back frame;
 wherein a cross-section of the lower cross member has a hook shape which substantially surrounds the recliner hinge shaft; and
 wherein a locking projection extends along an edge of the hinge-shaft cover in such a way as to extend upwards relative to the back frame and a diameter of the locking projection from the recliner hinge shaft is smaller than a diameter of a welding flange from the recliner hinge shaft so as to prevent the back pad from interfering with the recliner hinge shaft when the recliner hinge shaft is operated; and
 wherein upper portion of the locking projection is bent in a direction opposite to back pad from above an upper end of the recliner hinge shaft.

* * * * *